Patented Apr. 7, 1925.

1,532,521

UNITED STATES PATENT OFFICE.

DAVID THOMSON, OF LONDON, ENGLAND.

ALCOHOLIC SOLUTION OF ANIMAL PROTEINS AND METHOD OF PREPARING THE SAME.

No Drawing.   Application filed September 1, 1921.   Serial No. 497,703.

*To all whom it may concern:*

Be it known that I, DAVID THOMSON, a subject of the King of Great Britain and Ireland, and a resident of London, England, have invented a certain new and useful Improvement in Alcoholic Solutions of Animal Proteins and Methods of Preparing the Same, of which the following is a specification.

The object of my invention is the preparation of a fluid which shall contain alcohol with a large proportion of animal protein, in solution.

My invention consists in a process for preparing such a solution and in the liquid prepared by its use.

According to one method of carrying out my invention, I take a substance rich in animal protein, such as lean meat freed as far as possible from fat, and mince it finely. This mince is now treated with dilute solution of an alkali—preferably $$\frac{N}{5} Na_2CO_3$$

in the proportion, preferably, of one part by bulk of meat to four parts of the alkaline solution. The treatment is best carried out with vigorous mechanical stirring and at about 40 degrees C. but not higher. In about three hours the greater part of the meat will be dissolved. The liquid is then strained through fine muslin to remove as much solid matter as possible, and I have found it advantageous to pass it subsequently through a "Sharples" machine or other efficient centrifugal separator. After this, if the solution be not clear, it may be passed through a filter preferably of asbestos wool.

To the clear solution, dilute hydrochloric acid, preferably $\frac{N}{5}$ in strength, is gradually added until the acidity is about $P_H$ 4.7 in terms of hydrogen ion concentration. This throws down a heavy flocculent precipitate which is filtered off but is not allowed to drain beyond the point when it is still sufficiently wet to be easily stirred with a spoon. It is now stirred, preferably at about 40 degrees C. with dilute 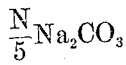 or dilute glycero-phosphoric acid. Sufficient acid, and only just sufficient, to dissolve the mass should be used and a translucent semi-gelatinous mass results, containing about 50% by bulk of the original wet precipitate.

The mass may now be added to an alcoholic fluid, such as whisky or brandy, or a strong wine (so long as it does not contain tannin) such as sherry, in such proportion that the resulting combination contains about 10% of its bulk of the original wet precipitate; in the case of brandy the proportion may be as high as 20%. The acidity of the resulting alcohol solution should not be less than $P_H$ 4.5.

I consider that it is advisable to add a slight flavouring of oil of lemon or capsicum. An alcoholic beverage of this kind should not be diluted with a strongly alkaline water or precipitation of the protein is liable to occur.

I claim:—

1. A method of producing alcoholic protein solutions which consists in mincing lean meat free from fat, subjecting the minced meat to the action of a dilute solution of alkali, next stirring the alkali and meat at a temperature of about 40° C. until it is dissolved, straining the solution, adding acid, removing the precipitate, stirring the same, and adding dilute glycero-phosphoric acid, and finally adding an alcoholic fluid.

2. A method of producing alcoholic protein solutions which consists in subjecting a substance rich in animal protein to the action of a dilute alkali, next filtering, then adding dilute acid to cause precipitation, next separating the precipitate and dissolving it in dilute acid, and subsequently mixing the solution with a fluid containing alcohol in a strength of 60%.

3. A method of producing alcoholic protein solutions which consists in subjecting a substance rich in animal protein to a dilute solution of $Na_2CO_3$, next heating and stirring to dissolve the protein substance, then filtering, adding dilute HCl to produce precipitation, again filtering, redissolving the precipitate by stirring with a suitable dilute acid, and subsequently mixing the resultant solution with a fluid containing alcohol in a strength of 60%.

In testimony whereof I have affixed my signature hereto this 8th day of August, 1921.

DAVID THOMSON.